May 11, 1965 P. J. GEERLINGS 3,182,968
BELT TYPE FEED BLENDER
Filed Oct. 18, 1963 2 Sheets-Sheet 1

INVENTOR
P.J. GEERLINGS

BY
ATTORNEY

May 11, 1965 P. J. GEERLINGS 3,182,968
BELT TYPE FEED BLENDER
Filed Oct. 18, 1963 2 Sheets-Sheet 2

INVENTOR
P.J. GEERLINGS

BY
ATTORNEY

United States Patent Office 3,182,968
Patented May 11, 1965

3,182,968
BELT TYPE FEED BLENDER
Petrus J. Geerlings, 2426 W. 4th St., Waterloo, Iowa
Filed Oct. 18, 1963, Ser. No. 317,193
3 Claims. (Cl. 259—9)

This invention relates to combinations of substances intended to be used for various purposes, the way in which such substances are combined or blended together into a unitary composition of the desired ingredients, and to apparatus and equipment by which such substances are mixed or blended to obtain uniformity and to render homogenous the mass of the resultant product.

The invention relates particularly to feed blending apparatus by which the ingredients which are combined to define the end product are uniformly blended into a homogenous mixture of the desired character and consistency and in the end product of which the proportions of the combined substances can be varied in accordance with the desire.

This application is in addition to that of my prior application 47,576, filed August 3, 1960, for a feed blender and contemplates a blender for accomplishing the same result as the above identified earlier application in order to provide a nutritionally correct consistent formula of the desired character to be fed to livestock and to provide in effect reliable apparatus for furnishing individual ingredients and to provide a uniform mixture of continued consistency.

It is an object of the invention to provide a feed mixer or blender employing a belt for transmitting the feed to the blender and capable of combining individual ingredients of different characteristics into a mixture or mass in which the proportions are closely controlled and are uniformly homogenous throughout the batch of the material prepared.

Another object of the invention is to provide a belt type mixer or blender including adjustable measuring means for each of the ingredients, a screw type mixer chamber and visible means whereby the quantities of the various ingredients can be controlled.

Another object of the invention is to provide a belt type feed blender of individual units with controlled flow and a mixing chamber into which each of the units is started and where thorough mixing and blending are accomplished prior to discharge of the contents of the machine.

Figure 1:
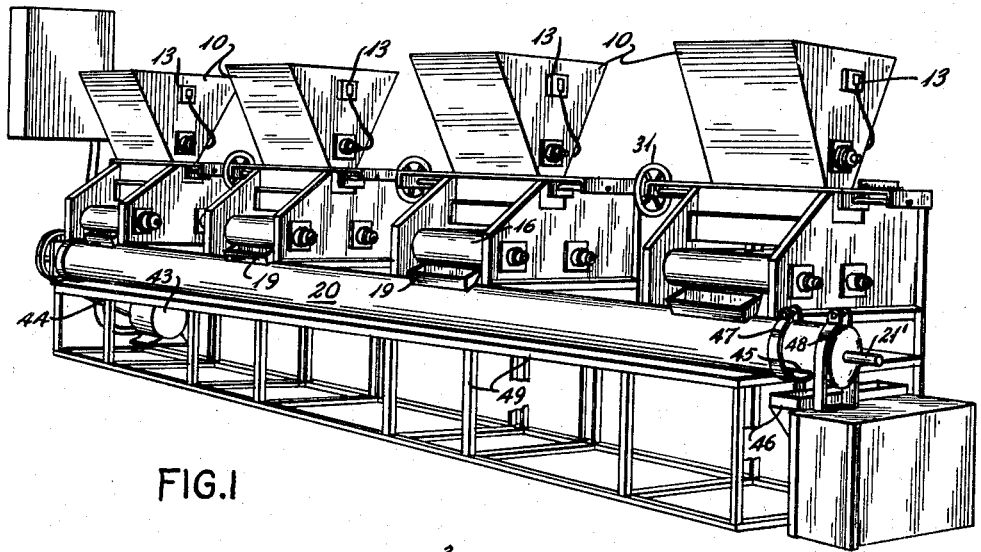
Figure 2:
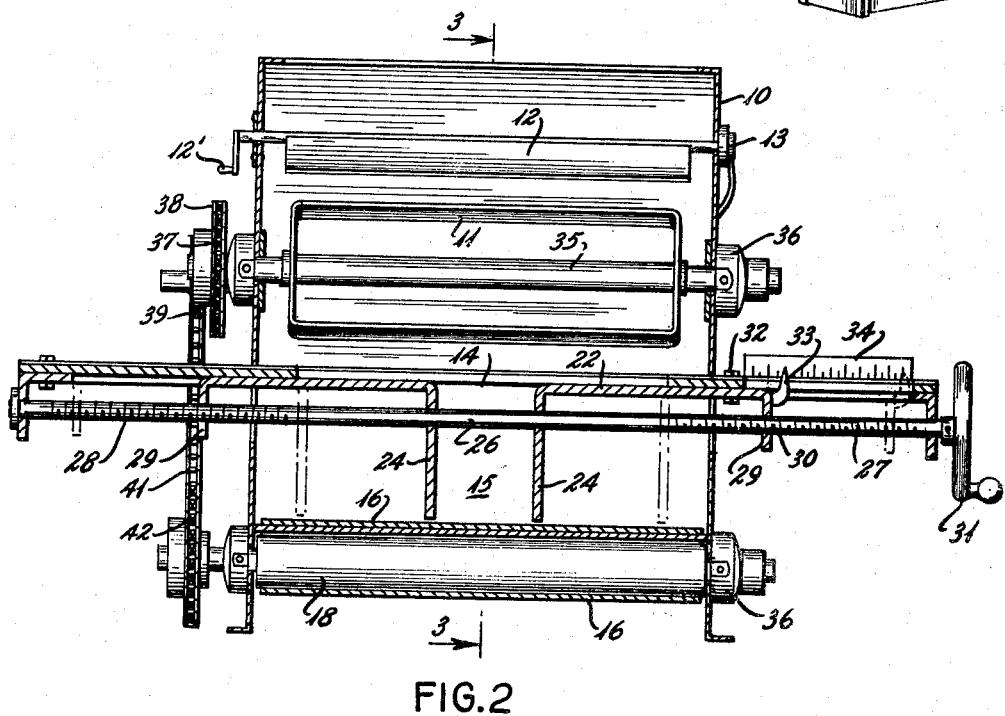
Figure 3:
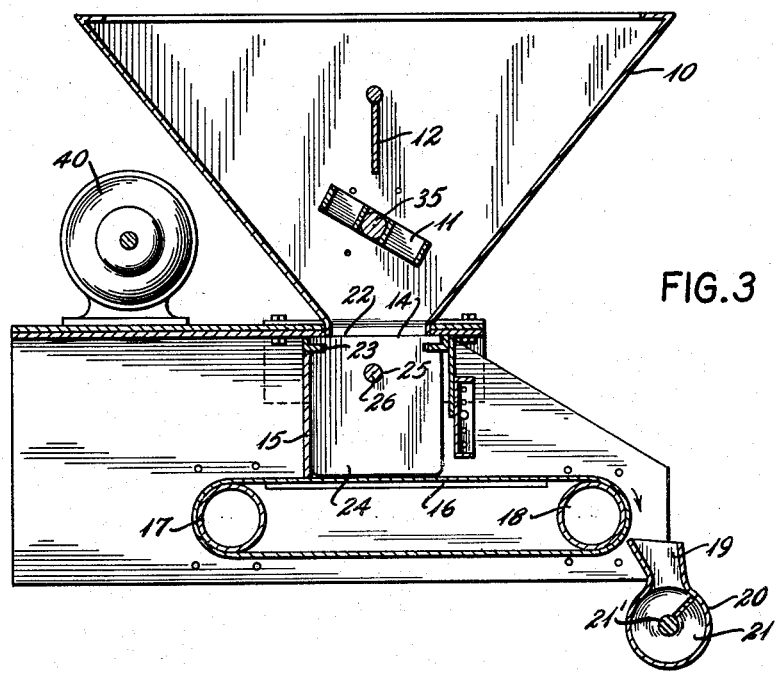
Figure 4:
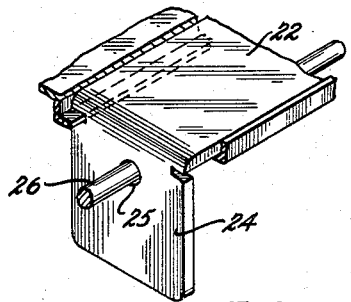

Other objects and advantages of the invention will be apparent from the following description taken in conjunction with the accompanying drawings in which:

FIG. 1 is a perspective of a feed blender in accordance with the present invention;

FIG. 2, a vertical section through one of the blenders;

FIG. 3, a vertical section at right angles to the view of FIG. 2 on the line 3—3 of FIG. 2;

FIG. 4, a fragmentary detailed perspective of one of the slide valves; and

Figure 5:
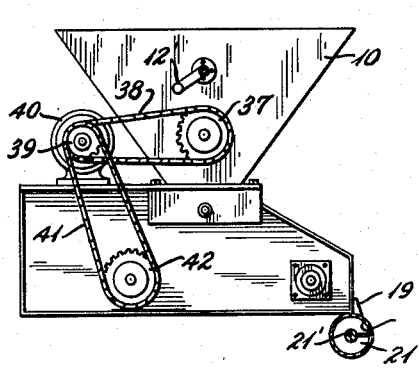

FIG. 5, a side elevation illustrating the drive mechanism of one of the blenders.

Briefly stated the invention comprises a series or bank of individual blenders having side by side hoppers provided with agitators which cause the contents of the several hoppers to be discharged. The discharge is through a controllable feed opening and a variable size feed box onto a belt which carries the ingredients and discharges the same through a funnel into a mixing chamber of tubular construction in which an auger integrates or thoroughly mixes the ingredients from the several hoppers and discharges the same through an outlet into collecting means for bagging.

With continued reference to the drawings, the belt blender of the present invention comprises a machine having a series of hoppers 10 for different materials or ingredients to be blended into feed for cattle and the like.

Each of the hoppers has an agitator 11 in its lower portion and in its upper portion an actuating plate 12 of an alarm switch 13 mounted on the exterior of the hopper with the plate extending into the hopper as indicated. This plate 12 may be raised by moving a handle 12′ and is intended to rest on material within the hopper until such time as the level of such material falls and the arm is no longer engaged. The arm then falls by gravity and energizes the switch 13 connected to an alarm system of any desired character (not shown) either to indicate to the operator that the material in the hopper is becoming exhausted or to actuate an automatic feed system for filling the hopper.

The material in the hopper flows downwardly by gravity through a feed opening 14 into a box 15 open along its bottom and front edge. Beneath the bottom of the hopper a belt 16 is mounted on rollers 17 and 18 and with a funnel portion 19 adjacent to each hopper and through which individual feed substances pass into a mixing cylinder 20 containing a mixing and conveying auger 21.

The opening 14 at the bottom of the hopper is provided with an adjustable member which forms in effect a gate valve 22 mounted in slideways 23, one at the front and one at the rear of the opening. The gate valve 22 has a depending portion 24 which extends downwardly and forms a closure for one side of the box 15. The depending portion 24 has an opening 25 in which is received a screw 26 with oppositely disposed threads 27 and 28 at its front and rear ends respectively. Each gate valve 22 has a second depending portion 29 parallel to the depending portion 24 with an opening 30 provided with threads complementary to the threads 27 so that when the screw 26 is rotated by means of a handle 31 fixed to the end of the screw, the parallel spaced portions 24 which form the sides of the box will be caused to move toward and from each other depending upon the direction of rotation of the screw. In order to determine the size of the opening in the bottom of the hopper the member 22 may have attached thereto by means of a fastener 32 a pointer 33 indicating volume by means of an associated gauge 34. Thus the amount of material being dispensed from the hopper can be determined.

The agitator 11 is mounted on a shaft 35 journaled in bearings 36 on the exterior of opposite sides of the hopper. Mounted on the shaft 35 on the outside of the hopper is a sprocket 37 driven by a chain 38 from a double sprocket 39 fixed to a shaft of a motor 40, such double sprocket also driving a chain 41 and a sprocket 42 which in turn drives roller 17 and a conveyor belt 16. The rollers 17 and 18 likewise are mounted in journal bearings 36.

It will be apparent from the foregoing that a series or bank of hoppers is provided each of which is adapted to discharge feed onto a conveyor 16, and from such conveyor 16 through the funnel 19 to the mixing cylinder 20 where the auger 21 with shaft 21′ rotates causing mixing of the feed from the several hoppers. The driving of the auger is accomplished by means of a shaft 21′ and motor 43 through a pulley and belt arrangement 44 at one end, the cylinder having a discharge opening 45 through which the feed falls into a chute 46 to place of bagging.

The discharge ends of the mixing chamber are mounted on brackets 47 and 48, and likewise are supported on frame structure 49.

It will be apparent from the foregoing that a simple practical feed mixer is provided by which a variety of food substances can be combined and mixed in the desired proportions of uniform consistency with minimum effort and attention.

In operation the gate 12 is adapted to rest on material within the hopper and when the material therein falls below a certain amount the gate will fall by gravity and will energize a switch connected to an alarm system either to indicate to the operator that the material in that hopper is getting low, or to activate an automatic feed system for filling the hopper.

The material in the hopper is fed downwardly through the feed opening 14 into a box 15 which extends substantially the whole width of the hopper and such material is discharged onto the belt type conveyor 16 which in turn discharges the material through a funnel into a blending and mixing chamber having an auger of the screw type. The amount of material discharged onto the belts is controlled by the slide valves 22 having the depending flanges 24 and slidably mounted in the feed box. The sides of the feed boxes are caused to move toward and from each other by the lead screw with right-hand threads in one end engageable by one of the slides and left-hand threads on the other end engageable with the other slide. The lead screw is rotated by a hand wheel mounted on one end and a percentage indicator is mounted on one of the slides and extends upwardly adjacent to the fixed scale indicating the volume dispensed or the amount of opening between the slides.

The belt conveyors are operated by sources of power such as electric motors 40. The motors 40 can be operated from a control panel mounted in a remote location.

In this device it is necessary only that the operator set the percentage of each hopper and to keep material in the various hoppers and all the mixing and blending will be done automatically. The various percentages can be regulated at any time and regardless of whether the machine is in operation or not.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. In combination a series of hoppers disposed in side by side relation and including means indicating the level of the contents in said hoppers, agitating means in said hoppers, said hoppers each having an opening in the bottom, wall structure defining a feed chamber beneath said hoppers, means for controlling the flow through said opening, means for controlling the size of said feed chamber, a mixing chamber for the ingredients of the several hoppers, a belt conveyor beneath each feed chamber for transmitting feed into said mixing chamber, and a screw conveyor in said mixing chamber for mixing and conveying feed to a point of discharge.

2. A feed blender comprising a hopper having an opening in its bottom, a feed box disposed beneath said hopper, a pair of gate valve members slidably mounted in said box and movable toward each other, each gate valve member having a depending portion forming a closure for one side of said feed box, an adjusting screw extending through said depending portion and having threads of a construction to move said depending portions toward and from each other when the screw is rotated, means whereby said screw can be rotated, indicator means carried by one of said gate valve members for indicating the position of said members, a mixing chamber, means for carrying the discharge from the bottom of the box to said mixing chamber, and means for performing a mixing action in said mixing chamber and for discharging the contents of said chamber.

3. A belt type feed blender comprising a series of independent hoppers disposed in spaced side by side relation, each hopper having a discharge opening in its bottom, agitating means in each of said hoppers, means for adjusting the size of said discharge openings, a belt for each hopper having an upper run in close proximity to said discharge openings for receiving feed passing through said openings, a mixing chamber disposed lengthwise adjacent and below said belts, said mixing chamber having openings in the same spaced relation as those of said hoppers, said openings in said mixing chamber receiving the discharge from said belts, said mixing chamber having a screw of a construction when rotated to mix the various discharges from each hopper, said mixing chamber having a discharge adjacent one end, supporting structure for the mixing chamber, and means on said supporting structure for driving said screw of said mixing chamber.

References Cited by the Examiner
UNITED STATES PATENTS

| | | | |
|---|---|---|---|
| 902,992 | 11/08 | McEvoy | 259—48 |
| 936,875 | 10/09 | Ewing | 259—61 |
| 1,151,956 | 8/15 | Lea | 222—415 |
| 1,692,302 | 5/25 | Hessmer | 251—212 |
| 2,120,437 | 6/38 | Feese | 222—57 |
| 2,810,394 | 10/57 | Ferguson | 251—212 |
| 3,131,911 | 5/64 | Geerlings | 259—25 |

CHARLES A. WILLMUTH, *Primary Examiner.*